Figure 1:
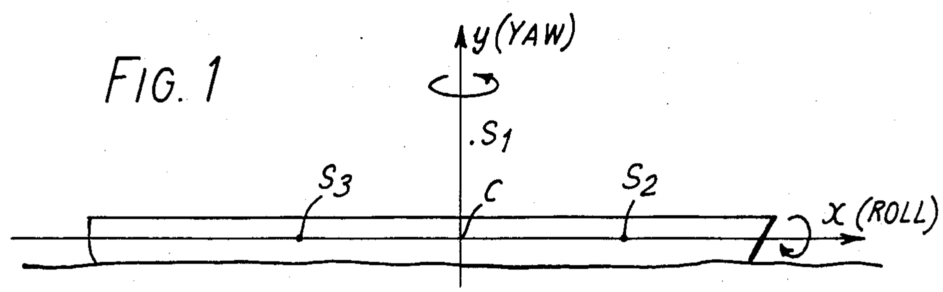

United States Patent [19]

Voles

[11] Patent Number: 4,719,467

[45] Date of Patent: Jan. 12, 1988

[54] DOPPLER IMAGING OF TARGETS

[75] Inventor: Roger Voles, London, England

[73] Assignee: EMI Limited, Hayes, England

[21] Appl. No.: 440,237

[22] Filed: Oct. 29, 1982

[30] Foreign Application Priority Data

Oct. 31, 1981 [GB] United Kingdom ................ 8132875
Sep. 1, 1982 [GB] United Kingdom ................ 8224903

[51] Int. Cl.[4] ............................................ G01S 13/89
[52] U.S. Cl. .................................... 342/179; 342/108
[58] Field of Search .................. 343/5 SA, 5 NQ, 17, 343/17.1 R, 5 CM, 338; 367/7, 8; 342/179, 108

[56] References Cited

PUBLICATIONS

R. Voles–"Radar Target Imaging by Rotation about Two Axes", *Proceedings of the Institution of Electrical Engineers*, vol. 125, No. 10, Oct. 1978, pp. 919–921.

*Primary Examiner*—T. H. Tubbesing
*Assistant Examiner*—Gilberto Barron, Jr.
*Attorney, Agent, or Firm*—Fleit, Jacobson, Cohn & Price

[57] ABSTRACT

A method and apparatus for imaging a target, such as a ship, exhibiting rotational movement about respective, mutually orthogonal axes. The method involves identifying a scattering center at the target exhibiting rotational movement about one axis only (the yaw axis, say, in the case of a ship) and then correlating an electrical signal related to the Doppler frequency of a return derived from that scattering center, and indicative of the angular velocity of the target about the one axis, with other electrical signals related to the Doppler frequencies of returns derived from other scattering centers. Correlation signals generated in this way provide an indication of the relative positions of the other scattering centers in relation to the one axis.

The apparatus may include means (12, 13, 14, 15) for generating electrical signals indicative of the Doppler frequencies of returns derived from different scattering centers at the target and means (17) for selecting signals derived from a scattering center exhibiting rotational movement about the one axis. An electrical signal indicative of the angular velocity of the target about the one axis is then computed at (21) and correlated at (22) with electrical signals indicative of the Doppler frequencies of returns derived from other scattering centers at the target. The correlation signals generated at 22 are then passed to a display (23) which presents the positions of the other scattering centers in relation to the one axis. A circuit (30) is used to generate another electrical signal related to the Doppler frequency of a scattering center exhibiting rotational movement only about a mutually orthogonal axis (the roll axis, say, in the case of a ship). The signal is also correlated at (22) so that a two dimensional representation of the target can be developed at the display (23).

4 Claims, 4 Drawing Figures y (YAW)
S1
S3
C
S2
x (ROLL)

FREQUENCY
S2
C1
C2
C3
TIME
S3 y
(YAW)
αy
H
αx
x
(ROLL)
TO RADAR
L

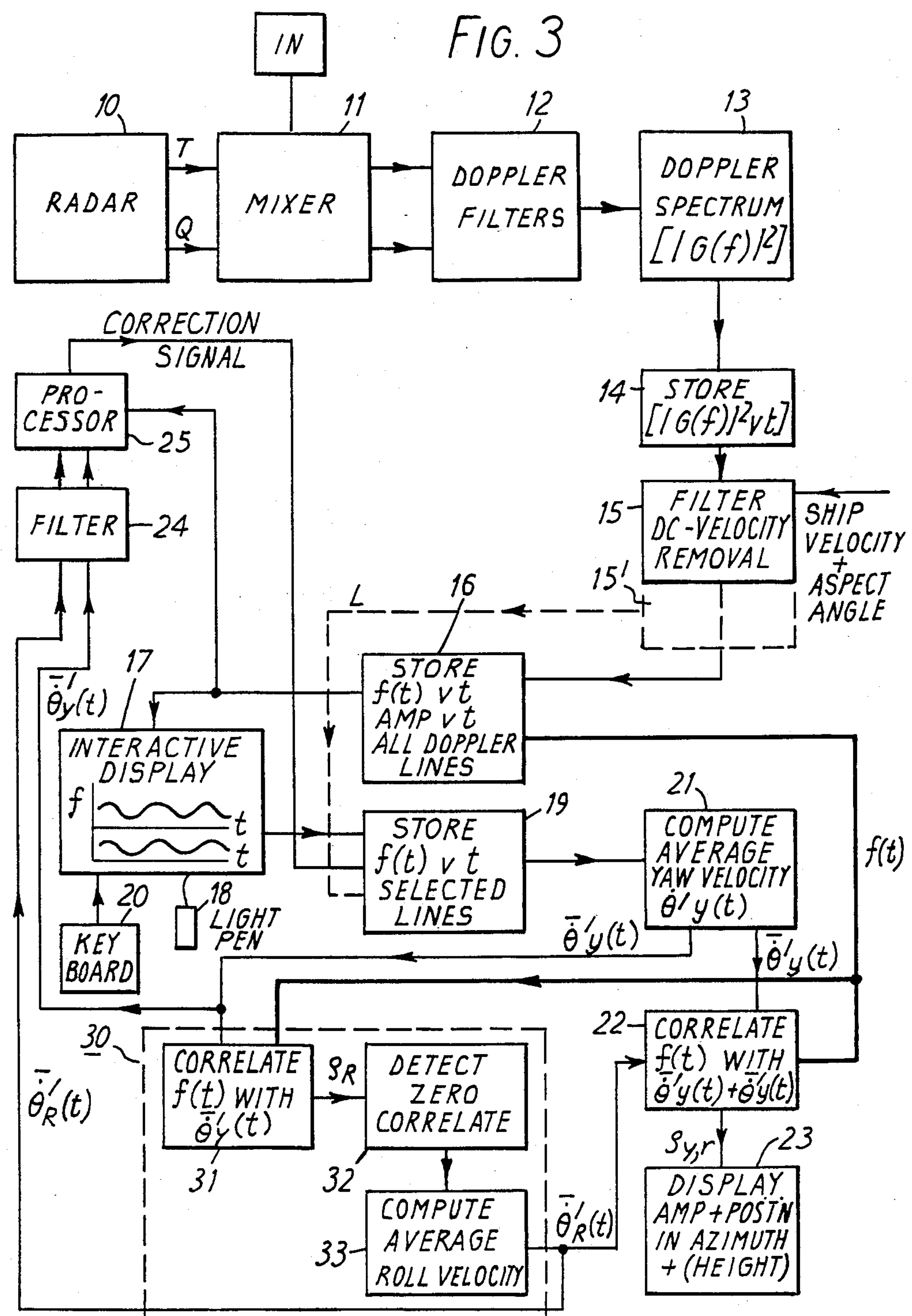

FIG. 3
IN
10
11
12
13
RADAR
T
Q
MIXER
DOPPLER FILTERS
DOPPLER SPECTRUM [|G(f)|²]
CORRECTION SIGNAL
PRO-CESSOR
25
14
STORE [|G(f)|² v t]
FILTER
24
15
FILTER DC-VELOCITY REMOVAL
SHIP VELOCITY + ASPECT ANGLE
L
16
15'
17
STORE f(t) v t AMP v t ALL DOPPLER LINES
INTERACTIVE DISPLAY
f
t
t
19
21
STORE f(t) v t SELECTED LINES
COMPUTE AVERAGE YAW VELOCITY θ'y(t)
f(t)
20
18
LIGHT PEN
KEY BOARD
θ'y(t)
22
CORRELATE f(t) WITH θ'y(t)+θ'y(t)
30
CORRELATE f(t) WITH θ'y(t)
gR
DETECT ZERO CORRELATE
θ'R(t)
31
32
gy,r
23
DISPLAY AMP+POSTN IN AZIMUTH +(HEIGHT)
33
COMPUTE AVERAGE ROLL VELOCITY
θ'R(t)

DOPPLER IMAGING OF TARGETS

This invention relates to radar system used to image targets, especially ships, by analysing the Doppler frequency of radar returns.

It has been shown (see for example a paper by R. Voles in Proc. IEE October 1978 pp 919–921) that by rotating a target successively about different orthogonal axes, through angles $\theta$, and then analysing the Doppler frequency of returns derived therefrom it is possible to construct an image of the target with a linear resolution of $\lambda_{2\theta}$, $\lambda$ being the wavelength of the radiation used.

Hitherto, however, it has been thought that this technique could not be successfully applied to the imaging of targets such as ships since it was believed that the rotational movements of the ship due to the natural sea disturbances do not occur in a sufficiently predictable manner to allow the instantaneous attitude of the ship to be inferred.

It is an object of this invention to provide an improved imaging system.

According to one aspect of the invention there is provided a method of imaging a target comprising the steps of monitoring radar signals returned from discrete scattering centres at the target to identify at least one scattering centre exhibiting rotational movement about a first axis only of the target, correlating a first electrical signal, related to the Doppler frequency of a return derived from said at least one scattering centre and indicative of the instantaneous angular velocity of the target about the first axis, with electrical signals related to the Doppler frequencies of returns derived simultaneously from other scattering centres at the target thereby to generate respective correlation signals indicative of the positions of those other scattering centres in relation to the first axis, and utilising said correlation signals to evaluate data indicative of the target.

The method may include generating a plurality of electrical signals indicative of the Doppler frequencies of returns derived from different scattering centres at the target, identifying a pair of electrical signals indicative of respective returns exhibiting Doppler frequencies which vanish coincidently and otherwise vary, with time in opposite senses, said pair of returns being derived from scattering centres exhibiting rotational movement about said one axis only of the target, and using an electrical signal, so identified, to form said first electrical signal.

According to another aspect of the invention there is provided an apparatus for imaging a target comprising:

means for monitoring radar signals returned from discrete scattering centres at the target and capable of identifying at least one scattering centre exhibiting rotational movement about a first axis only of the target, means for correlating a first electrical signal, related to the Doppler frequency of a return derived from said at least one scattering centre and indicative of the instantaneous angular velocity of the target about said first axis with electrical signals related to the Doppler frequency of returns derived simultaneously from other scattering centres at the target thereby to generate respective correlation signals indicative of the positions of those other scattering centres in relation to said one axis, and means for utilising said correlation signals to evaluate data indicative of the target.

The monitoring means may include means for generating a plurality of electrical signals indicative of the Doppler frequencies of returns derived from different scattering centres at the target, and the apparatus may include means for identifying a pair of electrical signals indicative of a respective pair of returns exhibiting Dopper frequencies which vanish coincidently and otherwise vary, with time, in opposite senses, said pair of returns being derived from scattering centres exhibiting rotational movement about said one axis only of the target, and means for utilising an electrical signal, so identified, to generate said first electrical signal.

Figure 2:
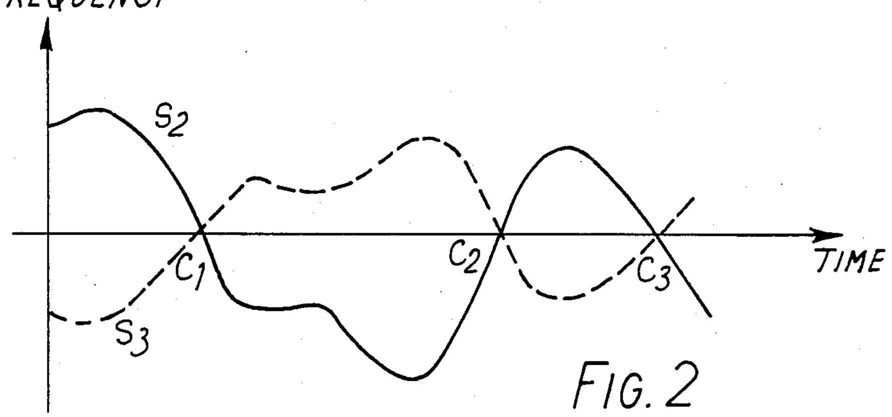
Figure 4:
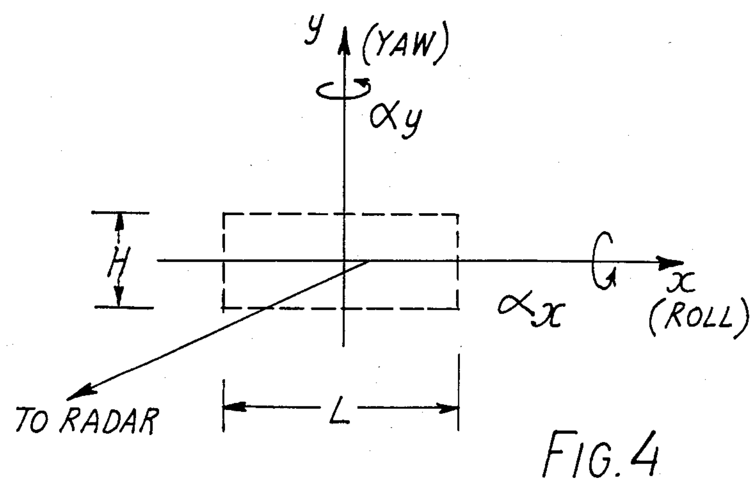

In order that the invention may be more readily understood and carried into effect specific embodiments thereof are now described by way of example only by reference to the accompanying drawings of which, FIG. 1 shows a schematic broadside view of a ship, FIG. 2 shows a plot of Doppler frequency against time for two scattering centres on the roll axis of the ship, FIG. 3 shows an imaging system of the present invention and FIG. 4 shows a highly schematic side view of a target useful in understanding how the spatial resolution of images may be increased.

The invention will be described initially in relation to the particular problem of imaging a ship when viewed in a side-on attitude i.e. the broadside case. In the broadside case of FIG. 1, it is assumed in this example that the ship is subject to two kinds of rotational movement due to sea disturbances, namely a roll motion which occurs about the roll axis x, extending longitudinally of the ship and a yaw motion which occurs about the mutually perpendicular, yaw axis y extending vertically through the centre of the ship. These two axes x and y intersect at the centre of attitude of motion C of the ship.

In general, scattering centres ($S_1$, say) on the ship are subject to rotational motion including components due both to roll and yaw. The inventor has recognised however, that certain "principal" axis scattering centres exhibit movement (to and away from the observer) about one axis (x or y) only and that imaging of the ship will be possible if one or more such principal scattering centres can be identified.

In the broadside case, the principal axis scattering centres will be of two kinds, namely "yaw axis scatterers" located on or close to the yaw axis and which exhibit rotation (to or away from an observer) about the roll axis only, and conversely "roll axis scatterers" located on or near to the roll axis and so exhibiting rotation about the yaw axis.

In one implementation of the invention "roll axis scatterers" are identified by analysing the variation with time of the Doppler frequency of returns derived from different scattering centres of the ship. It will be apparent that a pair of "roll axis scatterers" $S_2$ and $S_3$, say lying on opposite sides of the yaw axis have Doppler velocities of opposite sign, that is one of the scattering centres in the pair approaches an observer as the other recedes. The scattering centres in a pair do, however, attain the maximum extent of their rotational motion at the same instant and so their respective Doppler frequencies are observed to vanish in coincidence. It follows, therefore, that a pair of "roll axis scatterers" can be located by identifying radar returns having Doppler frequencies which vanish coincidently, but otherwise vary in opposite senses. The variation with time of the Doppler frequencies derived in respect of the two roll axis scatterers $S_2$ and $S_3$ are illustrated by way of example by the respective full and dashed line curves of FIG. 2, their coincident zero crossing points, occuring during the observed time interval, being shown at $C_1$, $C_2$ and $C_3$. It will be apparent that if $S_2$ and $S_3$ were located symmetrically in relation to the yaw axis y then their respective Doppler frequencies would vary antisymmetrically with time.

It will be appreciated that the magnitude of the Doppler frequency f(t) is related to the instantaneous yaw angular velocity $\dot{\theta}_y(t)$ of the corresponding scattering centre by a constant scaling factor proportional to L, the distance of that scattering centre from the yaw axis. If, for simplicity, it is assumed that the Doppler frequency varies as $f_a(t)=f_a \sin(\omega t)$, where $f_a$ is the peak value of the Doppler frequency for the $a^{th}$ roll axis scatterer, then the function $$\dot{\theta}_y'(t) = \frac{f_a(t)}{f_a}$$

provides an unscaled measure of the yaw angular velocity $\dot{\theta}_y(t)$ and so gives an indication of the rotational motion of the ship about the yaw axis. If a number of "roll axis scatterers" (e.g. the $a^{th}$, $b^{th}$ . . . $n^{th}$) have been identified then the average quantity $\bar{\dot{\theta}}_y'(t)$ may be computed by determining the mean of the respective weighted Doppler frequencies $$\frac{f_a(t)}{f_a}, \frac{f_b(t)}{f_b} \ldots \frac{f_n(t)}{f_n}.$$

By cross-correlating the function $\bar{\dot{\theta}}_y'(t)$, say, with the Doppler frequencies f(t) derived from other, as yet unclassified scattering centres, it is possible to derive values for the correlation function $\rho_y$, where $$\rho_y = \sum_{n=1}^{m} f(nt_o)\, \bar{\dot{\theta}}'_y(nt_o)$$

which represents the relative positions of these other scattering centres along the length of the ship. In this example $\rho_y$ is derived by correlating m samples at time intervals of $t_o$ and typically the entire analysis may last about 100 secs. Since, moreover, the roll and yaw motions of the ship are totally uncorrelated it has been recognised that Doppler frequencies f(t) having zero cross-correlation with the quantity $\dot{\theta}'_y(t)$ must be derived from scattering centres located on or close to the yaw axis and are yaw scatterers. Having identified one or more yaw scatterers in this way, therefore, it is again possible, using the procedures outlined hereinbefore, to derive an unscaled measure of the roll velocity $\dot{\theta}_R(t)$ which can then be cross-correlated with Doppler frequencies derived from other scattering centres on the ship, the respective value $\rho_R$ of the resulting cross-correlation function being indicative of the relative heights of those other scattering centres i.e. their relative spacing from the roll axis.

By systematically cross-correlating the Doppler frequencies derived from all the scattering centres on the ship with the yaw and roll angular velocities identified by the procedure outlined above, it is possible to compute the positions of these scattering centres in relation to both the roll and yaw axes and so map out a two dimensional representation of the ship. If, of course, a one dimensional representation only of the ship is required (e.g. the height dimension is to be ignored) then it is, for example, necessary only to identify roll scatterers prior to cross-correlation with other scattering centres on the ship.

The procedures outlined hereinbefore have assumed that the ship presents a broadside aspect to the observer. In general, however, this will probably not be the case and the Doppler frequency of returns may include a significant component due to the absolute velocity of the ship towards or away from the observer. It is, however, relatively simple, using radar techniques well known in the art, to track the ship to determine both the absolute velocity and aspect angle relative to the observer (See for example "Radar Systems" by Skolnick Chapter 5 p 164-197). The Doppler frequency of returns derived from different scattering centres can be reliably adjusted therefore to eliminate those components due to the steady motion of the ship to thereby isolate the components due solely to rotational motion.

Moreover, when the ship assumes a non broadside aspect and a radar having high range resolution is used valuable range information, useful in imaging the ship, can be derived and the location of prinipal scattering centres inferred. Thus, for instance, a scatterer located near the bow of the ship is likely to be near the deck and hence a roll scatterer, whereas the Doppler frequency of a scatterer identified near the centre of the ship is likely to be indicative of a roll motion (if a near-broadside aspect is observed) or a pitching motion about an axis mutually perpendicular to the yaw and roll axes (if a near end-on aspect is observed). Thus, although principal scattering centres can be identified by the technique described hereinbefore in relation to the broadside case, range partitioning of the ship, possible in the non-broadside case, facilitates the identification of scatterers or axes. As before, once the "principal" axis scattering centres have been identified, an image of the ship can be developed by cross-correlating their respective angular motions with the Doppler frequencies derived from other scattering centres on the ship. Since, moreover, correlation with both pitch and roll motion yields a measure of the height of a scatterer in relation to the roll axis it proves to be unnecessary to separate out the components of Doppler frequency due to these two kinds of rotational motion. Range measurements can also be used to estimate the length of the ship which can be used to scale the image derived by cross-correlation. This technique can only be applied to scale distances measured from the yaw axis, however the height scale being unknown and indeterminate—at least by range measurements.

FIG. 3 illustrates an example of a system used for implementing the above-described imaging techniques. A conventional radar 10, including a phase coherent transmitter and receiver, generates, at the I and Q outputs from a phase sensitive detector, signals representing radar returns received from the target—namely a ship. Over a time interval $\tau$ (small compared with the period of rotation of the ship), the radar returns received from different scattering centres on the ship exhibit a variety of Doppler frequencies on account of the different Doppler velocities of scattering centres. Signals generated by the radar 10, are passed via a mixer 11 (to be described hereinafter) and a broadband Dopper filter 12 through a Doppler frequency analyser 13 to generate Doppler spectra $|G(f)|^2$ indicative of the distribution of Doppler frequencies, measured over the time interval $\tau$, the spectra generated in this way being stored, as a function of time, at 14.

A suitably programmed processor 15 is then used to "filter" the time varying Doppler spectra $|G(f)|^2$ to extract therefrom continuous "tracks" of Doppler frequency against time, each track representing the Doppler motion of a different scattering centre on the ship (Two such tracks are illustrated in FIG. 2 in relation to the roll scatterers $S_2$ and $S_3$ of FIG. 1). The microprocessor also receives data from a tracking radar indicating the absolute velocity and aspect angle of the ship and this data is used to subtract a corresponding superfluous DC component from each identified Doppler frequency track, the corrected tracks being stored at 16 together with the variation with time of the amplitude of the corresponding radar returns.

In one embodiment of the invention, an interactive display 17 is used whereby Doppler frequency tracks resulting for the motion of two or more different scattering centres on the ship may be viewed simultaneously for comparison. As described, hereinbefore, it is possible to identify from such a comparison roll axis scatterers located on opposite sides of the yaw axis since their corresponding Doppler frequencies are found to vanish coincidently, but otherwise vary in opposite senses. Doppler frequency tracks satisfying these criteria may be marked using a light pen 18, and then stored at location 19 for further use and a user-operable key board 20 is provided to retrieve selected Doppler tracks from store 16 for observation, as required. Having identified one or more roll axis scatterers in this way the average (unscaled) yaw velocity $\overline{\dot{\theta}'_y}(t)$ (derived in the manner described earlier) is computed at 21 and passed to a processor 22 for correlation with Doppler frequencies f(t) derived from other scattering centres, accessed from store 16. The resulting correlation functions $\rho_y$, indicative of the position of these other scattering centres relative to the yaw axis are then displayed on a monitor 23 with a brightness or colour, say, indicative of the amplitude of the corresponding radar return. If a two dimensional image of the ship is required then an additional circuit, enclosed within the dashed-line box 30 is used. As described earlier, the instantaneous yaw velocity $\dot{\theta}_y'(t)$ is again cross-correlated at 31 with Doppler frequencies f(t) derived from the other scattering centres on the ship, and the resulting correlation functions $\rho_R$ passed to a zero detecting circuit 32. Detection of a zero cross-correlation in this manner indicates that the corresponding Doppler frequency f(t) must be derived from a yaw axis scatterer and is used at 33, along with other such Doppler frequency measurements, to compute the (unscaled) average roll velocity $\dot{\theta}'_R(t)$. As before, the velocity $\dot{\theta}_R(t)$ is then correlated at 22 with Doppler frequencies derived from other scattering centres to generate signals $\rho_R$ indicative of the relative positions of the other scattering centres from the roll axis i.e. their relative heights, and such signals are again displayed at 23.

In this way an unscaled two-dimensional image of the ship can be developed on the monitor, and if the length of the ship is known, from ranging measurement, this image may be scaled along its length.

In another embodiment of the invention, the interactive display 17 used for identifying roll scatters may be replaced by an automatic system forming a part 15' of the programmed microprocessor 15. In these circumstances, the interactive display 17 is omitted and selected Doppler frequency tracks, identified at 15', are passed via a channel indicated by the dashed line L to the store 19.

The Doppler frequency resolution of a radar will depend on the time interval $\tau$ over which measurements are made. This can be illustrated by considering the simplified case, shown in FIG. 4, in which the respective yaw and roll angular motions $\alpha_x, \alpha_y$ of a target having a length L and height H are represented by respective independent sinusoids, $$\alpha_x = A_x \sin\left(\frac{2\pi t}{T_x} + \psi_x\right)$$

and $$\alpha_y = A_y \sin\left(\frac{2\pi t}{T_y} + \psi_y\right)$$

At the instant $\alpha_x$ passes through zero, $\dot{\alpha}_x$ is at a maximum and the Doppler spectrum is wide. However, over the interval of observation $\tau, \dot{\alpha}_y$ will not, in general, have been zero and as a result the observed Doppler frequencies will be caused shift or "dilate" to neighbouring frequencies.

It can be shown that in these circumstances the Doppler frequency resolution can be optimised if the interval $\tau$ is set at a value $\hat{\tau}$ given by $$\hat{\tau} = \frac{T_y}{2\pi}\left(\frac{\lambda}{2LA_y}\right)^{\frac{1}{2}}, \quad \text{Equation (1)}$$

where $\lambda$ is the wavelength of radiation used. In the unlikely event that $(LA_y/T_y)$ is very small the limit on Doppler frequency resolution may then depend on the "smearing" over the time interval $\tau$, of $\dot{\alpha}_x$ about the maximum value $\hat{\dot{\alpha}}_x$, and the interval $\tau$ should then be set to a value $\hat{\tau}$ given by $$\hat{\tau} = \frac{T_x}{\pi}\left(\frac{\lambda}{HA_x}\right)^{\frac{1}{3}} \quad \text{Equation (2)}$$

It can be shown that a number of pixels $M_y$ resolvable along the y axis is given, for this example, by $$M_y = \frac{4\pi\, H\, A_x}{\lambda\, T_x}\hat{\tau}$$

and so the spatial resolution of the image could be improved if the optimised observation period $\hat{\tau}$ were to be increased. By symmetry $$M_x = \frac{4\pi L A_y}{\lambda T_y}\hat{\tau} \text{ where } \hat{\tau} = \frac{T_x}{2\pi}\left(\frac{\lambda}{2HA_x}\right)^{\frac{1}{2}} \text{ or } \frac{T_y}{\pi}\left(\frac{\lambda}{LA_y}\right)^{\frac{1}{3}}$$

In a practical example of a ship having length L=60 m, height H=20 m and having respective yaw and roll motions $A_x$, $A_y$ of ±6° and ±2°, $LA_y=HA_x$ and by using a 3 m radar superstructure of a ship will be resolved into $M_x$ ($=M_y$) pixels ≦11.5 (if Equation (1) applies) and ≦66 (if Equation (2) applies, and if the respective period Tx, Ty are 10 secs the corresponding values of $\hat{\tau}$ are respectively $\leqq 140$ ms and $\leqq 785$ ms. In practice it is necessary to use the smaller value of $\hat{\tau}$.

It has been found that it is possible to increase the observation period by reducing the effective "dilation" and "smearing" discussed above, and in this way the spatial resolution of scattering centres can be increased. In the arrangement of FIG. 3, the values of $\dot{\theta}_R'(t)$ and $\dot{\theta}_y'(t)$; generated in relation to each scattering centre are passed to a filter 24 which generates "smoothed" signals by taking into account a knowledge of the ship's dynamics. These smoothed signals are then used by processor 25 to generate further signals representing the expected variation with time of Doppler frequencies corresponding to the smoothed motion of each scattering centre. The Doppler frequencies generated at 25 are compared with raw data stored at 16, any error signal being used to steer a local oscillator to suitably adjust the frequency of selected lines stored at 19. The procedure may be repeated iteratively. Since the effective "smearing" and "dilation" are reduced an increased observation period $\tau$ is allowed. Referring to the numerical examples set out above, the initial image derived from uncorrected data would be resolvable into 11 pixels, allowing the mean (unscaled) Doppler velocity to be calculated to an accuracy of 10%. It follows that the Doppler resolution of corrected data following the first iteration can be increased by a factor of 10 and so the image is then resolvable into 115 pixels (along both the roll and yaw axes). Further iteration may be performed to achieve further improvements.

Since the transmitter and receiver of the imaging system are likely to be mounted to an unstable platform (on another ship or on an aircraft, for example) the output of an on-board Inertial Navigation System (IN) can be mixed at 11 with raw data to thereby compensate for the motion of the platform.

It will be appreciated that although the invention has been described in relation to the imaging of ships, it is also applicable to the imaging of other targets exhibiting rotational motion about one or more axes.

What we claim is:

1. A radar for producing an image of a rotating target, the radar including, means for transmitting a succession of radar pulses and for receiving corresponding returns from a target, means for evaluating the Doppler frequency of returns received from at least two scatterers at the target, means for monitoring, as a function of time, a variation in the Doppler frequency of returns received from each said scatterer to detect a pair of scatterers whose returns have Doppler frequencies which vanish simultaneously and which otherwise vary with time in opposite senses, said pair of scatterers exhibiting rotational motion about a single axis only of the target, means for deriving a data signal representing the instantaneous angular velocity of said pair of scatterers about said single axis, means for correlating said data signal with returns derived simultaneously from other scatterers at the target to generate respective correlation signals representing the locations of said other scatterers with respect to said single axis, and means for utilising said correlation signals to evaluate data indicative of the target.

2. A radar according to claim 1 including means for weighting, by respective amounts, returns derived simultaneously from different scatterers, each exhibiting rotational motion about said one axis only the target, each said amount being related to the peak Doppler frequency exhibited by returns derived from a respective scatterer; and means for averaging the electrical signals, so weighted, to derive said data signal.

3. A radar according to claim 1 including means for detecting a return which is uncorrelated with said data signal, a detected return being derived from a further scatterer exhibiting rotational motion about a second axis only of the target, orthogonal to said first axis, and means for utilising a return, so detected, to generate a second data signal, representing the instantaneous angular velocity of said further scatterer about said second axis, and wherein said correlation means is capable of correlating both said first and second data signals with returns derived similtaneously from scatterers, other than scatterers positioned on said first and second axes, to generate respective correlation signals indicative of the positions of said other scatterers in relation to said first and second axes.

4. A radar according to claim 3 including means for generating from said first and second data signals respective first and second output signals indicative of a predicted variation in Doppler frequency of returns derived from one of said pair of scatterers and said further scatterer, and for comparing said first and second output signals with electrical signals related to the Doppler frequency of returns actually received from said one and further scatterers and means for changing said first and second electrical signals in dependence on said comparison.

* * * * *